# 2,961,432

BULK POLYMERIZATION COMPRISING POLYMERIZING A LIQUID MONOMER IN THE PRESENCE OF A POLYMER POWDER

Hans Fikentscher and Karl Herrle, Ludwigshafen (Rhine), Germany, assignors to Badische Anilin- & Soda-Fabrik Aktiengesellschaft, Ludwigshafen (Rhine), Rheinland-Pfalz, Germany No Drawing. Filed Nov. 17, 1953, Ser. No. 392,766

Claims priority, application Germany Nov. 19, 1952

7 Claims. (Cl. 260—87.1)

This invention relates to a new and improved method for the production of polymers.

The polymerization of the polymerizable derivatives of ethylene mostly is attended with a marked evolution of heat and hence occurs so vehemently that diluents or solvents must often be resorted to in a commercial-scale operation. The media generally used for this purpose are water, aqueous solutions, as well as substances which are solvents for the monomers, but non-solvents for the polymers, and substances which are solvents both for the monomers and the polymers. The trend in the art definitely is for saving costs involved in isolating, processing and drying the polymers so obtained and hence there is need for a process by which the polymerization of the monomeric compounds can be practiced in the absence of any diluents or solvents.

Inasmuch as the polymers formed are soluble in their monomers, as is the case for example with styrene, methyl methacrylate and with regulator-combined acrylic esters, it is possible to discharge the polymerization heat by suitable technical means without the use of diluents and solvents. Prior to our invention, however, no process was known by which derivatives of ethylene, the polymers of which are insoluble in their monomers, can be polymerized in a commercial scale in a satisfactory manner without the use of diluents or solvents. When such derivatives of ethylene are polymerized, the polymer is precipitated from the monomers, mixtures being formed which from a pasty form gradually pass into a powder form. The polymers so obtained however are liable to agglutination and clotting, especially by the action of the stirring and mixing mechanism, and in this state undergo overheating and consequent decomposition inside the polymer lumps.

Our invention therefore has for its principal object a process by which the polymerization of monomeric compounds, the polymers of which are insoluble in the monomers, can be efficiently and conveniently achieved without the use of diluents or solvents. Other objects will become apparent from the disclosure and the examples hereinafter, it being understood, however, that these are intended for illustrative purposes only without restricting our invention to the particular embodiments shown.

In the practice of our invention the polymerization of ethylene derivatives, the polymers of which are insoluble or sparingly soluble in their monomers, can be carried out in the absence of liquid diluents or solvents, by subjecting mixtures of liquid monomers and polymer powders of the same monomer or monomers, of which the percentage in monomers is so small that they too have pulverulent nature, to polymerizing conditions. When copolymers are to be produced, the copolymers started within a powder form should have at least approximately the same composition as the copolymers newly formed from the mixture of the monomers.

Examples of suitable derivatives of ethylene are acrylonitrile, vinyl chloride, vinylidene chloride and monochlorotrifluor ethylene, but the copolymers of the said monomers either between themselves or with other monomers, as for example vinyl compounds, such as vinyl acetate, vinyl benzoate, acrylic esters, methacrylic esters, styrene and allied products, can also be used, but with this latter type of polymers the proportion of acrylonitrile, vinyl chloride, vinylidene chloride or similar monomers should feasibly be at least 70 percent. Moreover, the new process according to our invention can be used quite generally with all polymerizable derivatives of ethylene, the polymers of which are insoluble or difficultly soluble in the monomers. By using mixtures of monomers, any type of copolymers which are insoluble or difficultly soluble or slightly swellable in the mixtures of the monomers, can be prepared by this method in powder form.

In the usual practice of our invention the mixtures of the polymer powder and the monomers should contain from about 30 to 90 percent by weight of the polymer powder and from about 70 to 10 percent by weight of the monomers, but any other proportion that ensures a powder form of the mixtures can also be used. The ability of polymer powders to combine certain quantities of monomers while retaining their powder form, is a function of the particle size and the surface nature of the powder and hence variable. The absorptive power of the polymer powder for liquid monomers increases proportionately with the values of the quotient $$\frac{\text{surface of polymer}}{\text{volume of polymer}}$$

Suitable polymer powders are those preferably having a particle size of between 0.01 and 2 milimeters. Polymer particles of the said magnitude are obtained, for example, by precipitation from aqueous polymer dispersions and subsequent drying, by spray-drying the polymer dispersions or by polymerizing the aforenamed monomers with agitation in the absence of solvents and diluents, but this practice allows only of small-scale operation because otherwise the polymerization reaction cannot be controlled, whereby explosions may occur.

In the practice of our invention we start with the polymer powder and add to this so much of the monomeric compound that no lumping will occur in the reactor. Further quantities of the monomer vinyl compound can be added to the pulverulent mixture as the polymerization proceeds. By efficient agitation and mixing provision is made that the polymer powder is evenly wetted with the inflowing monomer and well mixed through. Of particular utility for the mixing of powders for example are so-called Petzold mixers and, generally speaking, any type of mixers and stirrers which wipe off the polymer powder from the reactor wall without any marked pressure and do not allow the polymer to settle down at any place of the reactor for any length of time. But it is also possible to use any other means of agitation for obtaining an intimate contact between the liquid monomer and the polymer powder, the term agitation including also shaking the reactor or bubbling a gas into the monomer-polymer mixture. For the discharge of heat the reactor wall or the mixers and agitators can be cooled in conventional manner, or cooling means can be provided directly in or on the reactor.

The polymerization is carried out in the conventional manner at moderately raised temperatures in the presence of catalysts and, as the case may be, of activators and/or regulators. For initiating the polymerization reaction use is made of the known radicle-forming catalysts, as for example organic peroxides, such as acylperoxides, e.g. benzoyl peroxide, peroxides of fatty acids, the peroxide of cyclohexanone, alkyl hydroperoxides, such as tertiary butyl hydroperoxide, cumene hydroperoxide, dialkyl peroxides, such as di-tert.-butyl peroxide, hydrogen peroxide, furthermore azo compounds, such as azosisobutyronitrile and any other radicle-forming catalysts. The polymerization temperatures ordinarily used range between 20° and 100° C. It is also possible to operate under nitrogen or carbon dioxide pressure or at increased pressure; or evacuated vessels can also be used.

By suitable means, as for example conveyor worms, part of the polymer formed can be continuously removed from the reactor, so that with a continuous feed of the monomers the polymerization can be carried out in a continuous fashion. The pulverulent polymer removed from the reactor can be stripped of monomer, if any, by heating and the monomer so recovered be fed again into the reactor. The efficient and convenient way to prevent lump formation at the intake place of the reactor is to feed the monomers in such a manner as to get them into immediate contact with a great excess of polymer powder. To ensure an especially uniform distribution of the monomers in the polymer powder, the monomers can also be fed into the reactor in vapor form.

Compared to the techniques heretofore employed in the art, two distinct advantages are involved in the method according to our invention. Of these the first affords an appreciable and long sought-for improvement of the chemical processing technique by eliminating the necessity for the use of diluents or solvents by the expedient of working in the presence of polymer powders. Another advantage resides in the fact that the polymers are obtained in powder form and thus can be used without any additional processing.

Our invention will not be illustrated in some detail by way of the following examples without, however, being limited thereto. The parts given in the examples are parts by weight.

*Example 1*

200 parts of pulverulent polyacrylonitrile are charged in a reactor provided with a stirrer that brushes the wall thereof, 300 parts of monomeric acrylonitrile, to which 0.5 percent of benzoyl peroxide catalyst have been added, are then dropped-in over a period of 6 hours with the stirrer working. The monomer-polymer mixture should contain preferably from 50 to 80 percent of acrylonitrile. The temperature of the reactor is maintained at 70° C. The dropped-in monomeric acrylonitrile comes to polymerize in the pulverulent polymer without any lump formation. At the end of 8½ hours 100 parts of nonpolymerized monomeric acrylonitrile are distilled off, the bottoms left consisting of 400 parts of polyacrylonitrile having a pulverulent nature.

In a similar manner copolymers can be prepared from acrylonitrile and other monomeric compounds, as for example vinyl chloride, vinyl pyridine, N-vinylimidazol, acrylic esters and allied substances, it being only necessary in this case to so select the proportions of the monomers that the copolymers formed are not soluble in the mixture of monomers. In the copolymerization of acrylonitrile with the aforesaid vinyl compounds, the monomer mixtures used should preferably contain at least 80 percent by weight of acrylonitrile. In the practice of our invention the polymerization or copolymerization should preferably be carried out at boiling temperature or at a temperture in the vicinity of the boiling temperature.

*Example 2*

Into a closed pressure vessel fitted with a heating or cooling jacket and a high-efficiency stirrer polyvinyl chloride powder is fed in a quantity that the powder occupies about one fourth to one third of the vessel space. Then, while stirring, monomeric vinyl chloride which contains 0.5 percent of benzoylperoxide is added in a one-third quantity of the polyvinyl chloride placed in. The external temperature of the vessel is set at 65° C., the functional inner temperature being between 55° and 60° C. The pressure rises to 7.5 atmospheres. When the pressure begins to drop off (ordinarily after 3 hours), vinyl chloride in which 0.5 percent of benzoylperoxide are dissolved is again added as the polmerization proceeds. The quantity of vinyl chloride hourly added is about one fifteenth of the polymer quantity started with. The feed of vinyl chloride is discontinued when three quarters of the vessel space are filled up with powder. The temperature is maintained for another 5 hours with the pressure falling to 3 atmospheres. The quantity of the polymer which results in powder form is about two and half times that of the initial polymer.

By removing part of the polymer and adding a fresh quantity of monomerized catalyst-containing vinyl chloride, the polymerization can be made continuous. In general, the polymerization of vinyl chloride can be efficiently carried out at temperatures of between 30° and 70° C.

*Example 3*

Into a closed pressure vessel fitted with a heating or cooling jacket and a stirring mechanism a pulverulent copolymer from 95 parts of vinyl chloride and 5 parts of vinyl propionate is fed in a quantity that the powder occupies about one fourth to one third of the vessel space. The vessel is heated to an external temperature of about 65° C. and then a mixture of vinyl chloride and vinyl propionate (ratio 95:5) to which 1 percent of benzoyl peroxide have been added is allowed to run in. The quantity of monomer added to begin with is one third of the quantity of copolymer started with. When the initial pressure, being about 8 atmospheres, begins to drop, the monomer mixture is continuously fed in with the same proportion at such a rate that the polymer powder is always present in excess. The quantity of the monomer mixture which can thus be polymerized in the course of 48 hours will be about twice that of the polymer powder used when the polymerization was started.

In an analogous manner, instead of vinyl propionate, other vinyl compounds, such as vinyl acetate, methyl acrylate, butyl acrylate, acrylonitrile or vinylidene chloride can be polymerized with vinyl chloride. The mixture of one or more of the said monomers with vinyl chloride should preferably contain at least 85 percent of vinyl chloride.

*Example 4*

100 parts of vinylidene chloride containing 0.3 part of phenoxypropene oxide as a stabilizer against the splitting off of the hydrogen chloride, and 0.5 part of azoisobutyronitrile are polymerized in a porcelain bead filled rocking or revolving autoclave at about 40° C. for 6 hours. The soft-textured powder thus obtained still contains 25 parts of monomeric vinylidene chloride.

Into this mixture 400 more parts of vinylidene chloride to which 1.2 parts of phenoxypropene oxide and 2 parts of azoisobutyronitrile have been added, are pressed over a period of 12 hours, while stirring, the temperature being maintained at about 40° C. After distilling off 125 parts of unreacted vinylidene chloride, 375 parts of polyvinylidene chloride are left as a uniformly powdered substance. The powder particles have a size of less than 0.1 millimeter in diameter. The polymer is well soluble in hot cyclohexanone.

Copolymers containing at least 70 percent of vinylidene chloride can also be prepared by the method according to this example.

What we claim is:

1. A process for the bulk polymerization of at least one liquid monomeric compound selected from the class consisting of acrylonitrile, vinyl chloride, vinylidene chloride, vinyl acetate, vinyl propionate, vinyl benzoate, acrylic esters, methacrylic esters, styrene, vinyl pyridine and N-vinylimidazol, at least 70% of said liquid monomer being selected from the group consisting of acrylonitrile, vinyl chloride, vinylidene chloride, and mixtures thereof, wherein the polymer resulting from said polymerization is substantially insoluble in its monomeric mixture, which process comprises: polymerizing while admixing at least one of said liquid monomers with a polymer powder, the composition of said polymer powder being substantially the same as the added monomeric composition, in an amount such that said powder is evenly wetted with liquid monomer, but in the absence of any other diluent and solvent, and adding further quantities of said liquid monomer to the resulting monomer-polymer mixture as polymerization proceeds, the quantity of said liquid monomer in the monomer-polymer mixture being from about 10 to 70% by weight with respect to the mixture and being sufficiently small to maintain said mixture in a powdery form throughout the polymerization.

2. A process as claimed in claim 1 wherein the polymer powder has a particle size of between 0.01 and 2 millimeters.

3. A process as claimed in claim 1 wherein the polymerization is carried out at a temperature between about 20° C. and 100° C.

4. A process as claimed in claim 1 wherein the liquid monomer is acrylonitrile which is polymerized at its boiling temperature in admixture with a polyacrylonitrile powder having a particle size of from 0.01 to 2 millimeters.

5. A process as claimed in claim 1 wherein the liquid monomer is vinyl chloride which is polymerized at a temperature of between 30° C. and 70° C. in admixture with a polyvinyl chloride powder having a particle size of from 0.01 to 2 millimeters.

6. A process as claimed in claim 1 wherein the liquid monomer is vinylidene chloride which is polymerized in a closed vessel at a temperature of between 30° C. and 60° C. in admixture with a polyvinylidene chloride powder having a particle size of from 0.01 to 2 millimeters.

7. A process as claimed in claim 1 wherein said liquid monomer is a mixture of vinyl chloride and vinyl propionate containing at least 70% by weight of vinyl chloride.

References Cited in the file of this patent

UNITED STATES PATENTS

| | | |
|---|---|---|
| 2,234,993 | Vernon et al. | Mar. 18, 1941 |
| 2,279,067 | Shapiro | Apr. 7, 1942 |
| 2,318,845 | Feagin et al. | May 11, 1943 |
| 2,335,133 | Renfrew | Nov. 23, 1943 |
| 2,746,944 | Naps et al. | May 22, 1956 |

FOREIGN PATENTS

| | | |
|---|---|---|
| 679,562 | Great Britain | Sept. 17, 1952 |
| 714,868 | Great Britain | Sept. 1, 1954 |